(12) United States Patent
Sankavaram et al.

(10) Patent No.: US 11,551,488 B2
(45) Date of Patent: Jan. 10, 2023

(54) ADAPTIVE FAULT DIAGNOSTIC SYSTEM FOR MOTOR VEHICLES

(71) Applicant: GM Global Technology Operations LLC, Detroit, MI (US)

(72) Inventors: Chaitanya Sankavaram, Rochester Hills, MI (US); Shiming Duan, Ann Arbor, MI (US); Xiaomeng Peng, Malden, MA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 753 days.

(21) Appl. No.: 16/548,157

(22) Filed: Aug. 22, 2019

(65) Prior Publication Data

US 2021/0056780 A1    Feb. 25, 2021

(51) Int. Cl.
| | |
|---|---|
| *G07C 5/08* | (2006.01) |
| *G06K 9/62* | (2022.01) |
| *G07C 5/00* | (2006.01) |
| *G06N 20/10* | (2019.01) |

(52) U.S. Cl.
CPC ......... *G07C 5/0808* (2013.01); *G06K 9/6223* (2013.01); *G06K 9/6276* (2013.01); *G06N 20/10* (2019.01); *G07C 5/008* (2013.01)

(58) Field of Classification Search
CPC .. G06K 9/6223; G06K 9/6276; G06K 9/6284; G06K 9/6227; G06K 9/6277; G06K 9/6279; G06N 20/10; G06N 20/20; G06N 5/003; G06N 7/005; G07C 2205/02; G07C 5/008; G07C 5/0808; G07C 5/0816; G07C 5/0825; G07C 5/0833
See application file for complete search history.

(56) References Cited

U.S. PATENT DOCUMENTS

| | | | |
|---|---|---|---|
| 10,124,893 B1 * | 11/2018 | Aalund | G07C 5/006 |
| 11,120,353 B2 * | 9/2021 | Olabiyi | G06N 3/0445 |
| 11,373,466 B2 * | 6/2022 | Golov | B60R 21/013 |
| 2002/0193925 A1 * | 12/2002 | Funkhouser | G07C 5/0808 |
| | | | 701/31.8 |

(Continued)

FOREIGN PATENT DOCUMENTS

| | | | | |
|---|---|---|---|---|
| CN | 107144428 A | * | 9/2017 | G01M 13/045 |
| WO | WO-2019185659 A1 | * | 10/2019 | G05B 23/0221 |

*Primary Examiner* — Babar Sarwar
(74) *Attorney, Agent, or Firm* — Vivacqua Crane, PLLC

(57) ABSTRACT

A method of using an adaptive fault diagnostic system for motor vehicles is provided. A diagnostic tool collects unlabeled data associated with a motor vehicle, and the unlabeled data is transmitted to a central computer. An initial diagnostic model and labeled training data associated with previously identified failure modes and known health conditions are transmitted to the central computer. The central computer executes a novelty detection technique to determine whether the unlabeled data is novelty data corresponding with a new failure mode or normal data corresponding with one of the previously identified failure modes or known health conditions. The central computer selects an informative sample from the novelty data. A repair technician inputs a label for the informative sample, and the central computer propagates the label from the informative sample to the associated novelty data. The central computer updates the labeled training data to include the labeled novelty data.

20 Claims, 2 Drawing Sheets

(56) References Cited

U.S. PATENT DOCUMENTS

| | | | |
|---|---|---|---|
| 2003/0195675 A1* | 10/2003 | Felke | G05B 23/0278 |
| | | | 701/29.3 |
| 2005/0043869 A1* | 2/2005 | Funkhouser | G07C 5/0808 |
| | | | 701/33.4 |
| 2007/0088974 A1* | 4/2007 | Chandwani | G06F 11/0781 |
| | | | 714/6.11 |
| 2017/0206718 A1* | 7/2017 | Kapoor | G07C 5/0808 |
| 2017/0294059 A1* | 10/2017 | Noyelle | H04W 76/10 |
| 2017/0363515 A1* | 12/2017 | Poloni | G07C 5/02 |
| 2018/0114377 A1* | 4/2018 | Dyeyev | G06Q 10/20 |
| 2019/0012851 A1* | 1/2019 | Korchev | G07C 5/0808 |
| 2019/0122456 A1* | 4/2019 | Sata | G07C 5/0808 |
| 2019/0221058 A1* | 7/2019 | Nix | G01S 7/51 |
| 2019/0279440 A1* | 9/2019 | Ricci | H04W 4/48 |
| 2019/0316913 A1* | 10/2019 | Golov | G06V 20/56 |
| 2019/0384994 A1* | 12/2019 | Frossard | G06V 10/764 |
| 2020/0209002 A1* | 7/2020 | Hou | G05D 1/0088 |
| 2020/0219335 A1* | 7/2020 | Gintz | G07C 5/0841 |
| 2020/0250902 A1* | 8/2020 | Golov | B60R 21/0134 |
| 2020/0372729 A1* | 11/2020 | Duan | G07C 5/08 |
| 2020/0394850 A1* | 12/2020 | Sankavaram | G07C 5/008 |
| 2021/0094587 A1* | 4/2021 | Pilly | B60W 60/0051 |
| 2021/0394766 A1* | 12/2021 | Crawford | H04K 3/45 |

* cited by examiner

ADAPTIVE FAULT DIAGNOSTIC SYSTEM FOR MOTOR VEHICLES

INTRODUCTION

The present disclosure relates to diagnostic devices for motor vehicles, and more particularly to an adaptive fault diagnostic system and method of iteratively learning new vehicle failure modes, fault patterns, and health conditions for motor vehicles and communicating the associated diagnostic decisions to repair technicians.

Automotive manufacturers are continuously developing vehicle systems to improve upon the benefits associated with those systems. As one example, air intake systems have been improved to increase the operating range of turbochargers and improve fuel economy of the vehicles. The improved systems may add complex components, sensors, and control algorithms to vehicles, which can in turn increase the complexity of repairs and the time requirement to complete those repairs. More specifically, during repair and servicing of vehicles in the independent aftermarket, a repair technician can use a diagnostic tester to access diagnostic trouble codes (DTCs) and freeze frames stored in a vehicle's On-Board Diagnostic System, such that the repair technician can follow predetermined diagnostic procedures. However, DTCs and associated failure modes may not yet be discovered for new and complex vehicle systems. The repair technician may spend time inspecting the new and complex systems in order to diagnose the failure mode. The vehicle may experience previously unknown failure modes along its entire life cycle, which may require the repair technician to spend time inspecting those systems.

Thus, while current fault diagnostic devices achieve their intended purpose for known failure modes and fault patterns, there is a need for a new and improved diagnostic system and method that addresses these issues.

SUMMARY

According to several aspects of the present disclosure, a method of using an adaptive fault diagnostic system for motor vehicles is provided. The method begins with the step of using a diagnostic tool to collect a plurality of unlabeled data associated with a motor vehicle. The diagnostic tool transmits the unlabeled data to a central computer. In addition, an initial diagnostic model and a plurality of labeled training data associated with a plurality of previously identified failure modes and known health conditions are transmitted to the central computer. The central computer executes a novelty detection technique to determine whether the unlabeled data is novelty data corresponding with a new failure mode or normal data corresponding with one of the previously identified failure modes or known health conditions. The central computer selects an informative sample from the novelty data. A repair technician inputs a label for the informative sample. The central computer propagates the label from the informative sample to the associated novelty data to provide labeled novelty data. The central computer updates the labeled training data to include the labeled novelty data.

In one aspect, the central computer identifies at least one new failure pattern associated with the unlabeled data, where the new failure pattern is different from a previously identified failure pattern associated with the labeled training data.

In another aspect, the central computer identifies one or more new failure modes or one or more new health conditions associated with the unlabeled data, where the new failure modes are different from the previously identified failure modes, and where the new health conditions are different from the known health conditions.

In another aspect, the central computer uses a Random Forest classifier, a k-Nearest Neighbor classifier, and a Support Vector Machine classifier in a probabilistic setting to determine whether the unlabeled data is novelty data or normal data.

In another aspect, the central computer determines that the unlabeled data is novelty data in response to the central computer predicting the failure mode or a health condition with low confidence, and the central computer determines that the unlabeled data is normal data in response to the central computer predicting the failure mode or a health condition with high confidence.

In another aspect, the central computer selects the plurality of informative samples by executing an uncertainty selection algorithm, a diversity selection algorithm, and a representative selection algorithm.

In another aspect, the central computer propagates the label to the unlabeled data by using at least one of an $\varepsilon$-Neighborhood graph, a k-Nearest Neighborhood graph, and a b-matching graph.

In another aspect, the central computer propagates the label by executing a plurality of semi-supervised learning techniques using Gaussian Random Fields, Local and Global consistency, and adsorption.

According to several aspects, a method of using an adaptive fault diagnostic system for motor vehicles is provided. The method begins with the step of using a diagnostic tool to collect a plurality of unlabeled data for an associated vehicle. The unlabeled data is transmitted from the diagnostic tool to a central computer. An initial diagnostic model and a plurality of labeled training data associated with a plurality of previously identified failure modes and known health conditions are transmitted from a database to the central computer. The central computer executes a novelty detection technique to determine whether the unlabeled data is novelty data corresponding with a new failure mode or normal data corresponding with one of the previously identified failure modes or known health conditions. The central computer selects a plurality of informative samples from the novelty data. A repair technician inputs a label for the associated informative samples, and the central computer propagates the labels to the associated novelty data to provide labeled novelty data. The central computer updates the labeled training data and the initial diagnostic model to include the labeled novelty data, in response to the central computer determining at least one of: a number of the newly labeled samples being greater than a quantity threshold; a new failure mode being inputted by the repair technician that is different from the previously identified failure modes; a new health condition being inputted by the repair technician that is different from the known health conditions; and a duration of time from a most recent update of the labeled training data being longer than a time threshold.

In one aspect, the central computer identifies the labeled training data and the associated previously identified failure mode that correspond with the unlabeled data, and the central computer transmits a diagnostic decision corresponding with the associated previously identified failure mode to a repair technician.

In another aspect, the repair technician confirms that the diagnostic decision is correct by inputting a confirmation of the diagnostic decision.

In another aspect, the central computer identifies at least one new failure pattern associated with the unlabeled data, where the at least one new failure pattern is different from a previously identified failure pattern associated with the labeled training data.

In another aspect, the central computer identifies at least one new failure mode associated with the unlabeled data, where the at least one new failure mode is different from the previously identified failure modes.

In another aspect, the central computer uses a Random Forest classifier, a k-Nearest Neighbor classifier, and a Support Vector Machine classifier in a probabilistic setting to determine whether the unlabeled data is novelty data or normal data.

In another aspect, the central computer determines that the unlabeled data is novelty data in response to the central computer predicting the failure mode or a health condition with low confidence, and the central computer determines that the unlabeled data is normal data in response to the central computer predicting the failure mode or a health condition with high confidence.

In another aspect, the central computer selects the plurality of informative samples by executing an uncertainty selection algorithm, a diversity selection algorithm, and a representative selection algorithm.

In another aspect, the central computer propagates the label to the unlabeled data by using at least one of an, a k-Nearest Neighborhood graph, an ε-Neighborhood graph, and a b-matching graph.

In another aspect, the central computer propagates the label by executing a plurality of semi-supervised learning techniques using Gaussian Random Fields, Local and Global consistency, and adsorption.

According to several aspects, an adaptive fault diagnostic system for iteratively learning a new vehicle failure mode and communicating diagnostic decisions to repair technicians is provided. The system includes a diagnostic tool configured to collect a plurality of unlabeled data from a vehicle. The system further includes a database for storing a plurality of labeled training data. The system further includes a central computer communicating with the diagnostic tool to receive the unlabeled data and the database to receive the labeled training data. The central computer is configured to execute a novelty detection technique to determine whether the unlabeled data is novelty data or normal data. The central computer is further configured to select a plurality of informative samples from the novelty data. The central computer is further configured to receive a label, inputted by a repair technician, for the associated informative sample. In addition, the central computer is also configured to propagate the labels to the associated novelty data to provide labeled novelty data. Furthermore, the central computer is configured to update the labeled training data and the initial diagnostic model stored in the database to include the labeled novelty data.

In one aspect, the central computer is configured to update the labeled training data, in response to the central computer determining that: a number of the newly labeled samples is greater than a quantity threshold; a new failure mode has been inputted by the repair technician that is different from the previously identified failure modes; and a duration of time from a most recent update of the labeled training data is longer than a time threshold.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
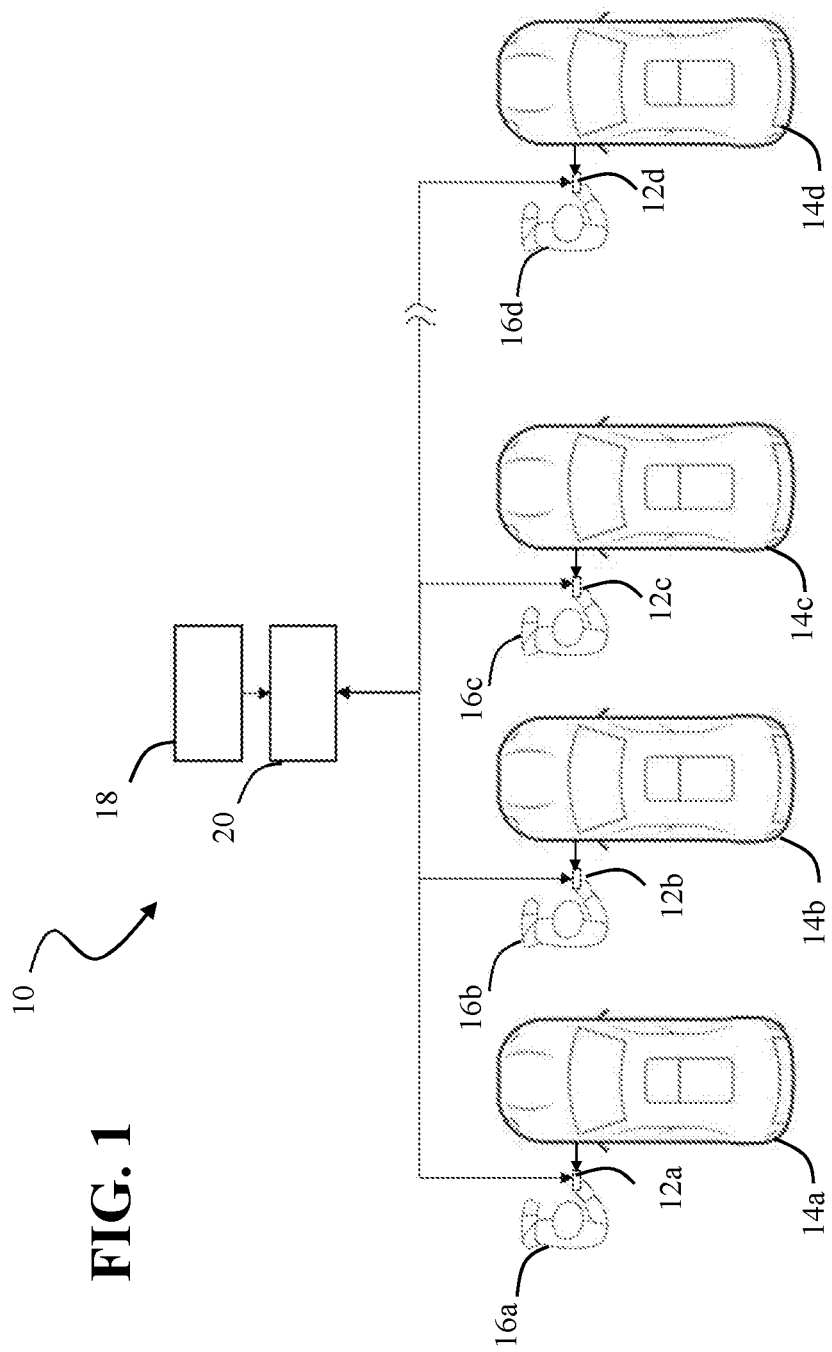
FIG. 1 is a schematic view of one embodiment of an adaptive fault diagnostic system having automated novelty detection and adaptive fault reasoning.

Referring to FIG. 1, there is generally illustrated a diagnostic system 10 for learning new failure modes, fault patterns, and health conditions for one or more fleets of vehicles and communicating the associated diagnostic decisions to repair technicians. The system 10 includes a plurality of diagnostic tools 12a, 12b, 12c, 12d or OBD2 scanners configured to collect a plurality of unlabeled data from the on-board diagnostic systems of associated vehicles 14a, 14b, 14c, 14d. In one example, the diagnostic tools 12a, 12b, 12c, 12d are located at a plurality of repair shops and operated by any number of repair technicians 16a, 16b, 16c, 16d to collect unlabeled data from vehicles 14a, 14b, 14c, 14d of various makes, models, trims, and model years. This permits the system 10 to diagnose, predict, and address the failure modes, the fault patterns, and the known health conditions of vehicles of the same or similar makes, models, trims, and model years.

The repair technician can attach the diagnostic tool to an OBD2 port (not shown) of the associated OBD system for the vehicle to access unlabeled data and associated failure modes. In other examples, the diagnostic tool can wirelessly communicate with the OBD system of the vehicle to collect the unlabeled data.

The system 10 further includes a database 18 for storing a plurality of labeled training data indicative of a plurality of previously identified failure modes and fault patterns. In one example, the labeled training data and associated failure modes and fault patterns can be empirically determined during testing and test drives by the car manufacturer prior to the release date of the vehicle. However, it is contemplated that the labeled training data and associated failure mode and/or fault patterns can be determined by any suitable method at any stage during the life cycle of the model vehicle.

The system 10 further includes a central computer 20 configured to execute machine logic techniques to detect novelties and learn the associated new failure modes based on input received from the repair technician. In this example, the central computer 20 communicates with the diagnostic tools 12a, 12b, 12c, 12d to receive the unlabeled data from the vehicles 14a, 14b, 14c, 14d, and the central computer 20 further communicates with the database 18 to receive the labeled training data associated with previously identified failure modes. The central computer 20 is configured to execute a novelty detection technique to determine whether the unlabeled data is novelty data or normal data. In this example, the central computer 20 uses a Random Forest classifier, a k-Nearest Neighbor classifier, and a Support Vector Machine classifier in a probabilistic setting to determine whether the unlabeled data is novelty data or normal data. However, the central computer 20 can used any suitable classifier to detect novelty data.

The central computer 20 is further configured to select a plurality of informative samples from the novelty data. The central computer 20 selects the informative samples by executing an uncertainty selection algorithm, a diversity selection algorithm, and a representative selection algorithm. However, it is contemplated that the central computer can select the informative samples by executing any suitable algorithm.

The system 10 is further configured to permit the repair technician to review the informative sample, determine a failure mode associated with the informative sample and/or inspect the vehicle to provide a label for the informative sample. The repair technician can input into the diagnostic tool 12a, 12b, 12c, 12d the label for the informative sample, and the central computer 20 is configured to receive the label from the diagnostic tool 12a, 12b, 12c, 12d.

The central computer 20 is further configured to propagate the label, such that the associated novelty data becomes newly labeled novelty data. The central computer 20 is further configured to update the labeled training data stored in the database to include the labeled novelty data, in response to the central computer 20 determining that: a number of the newly labeled samples is greater than a quantity threshold; a label or new failure mode has been inputted by the repair technician and is different from the previously identified failure modes; and a duration of time from a recent update of the labeled training data is longer than a time threshold.

Figure 2:
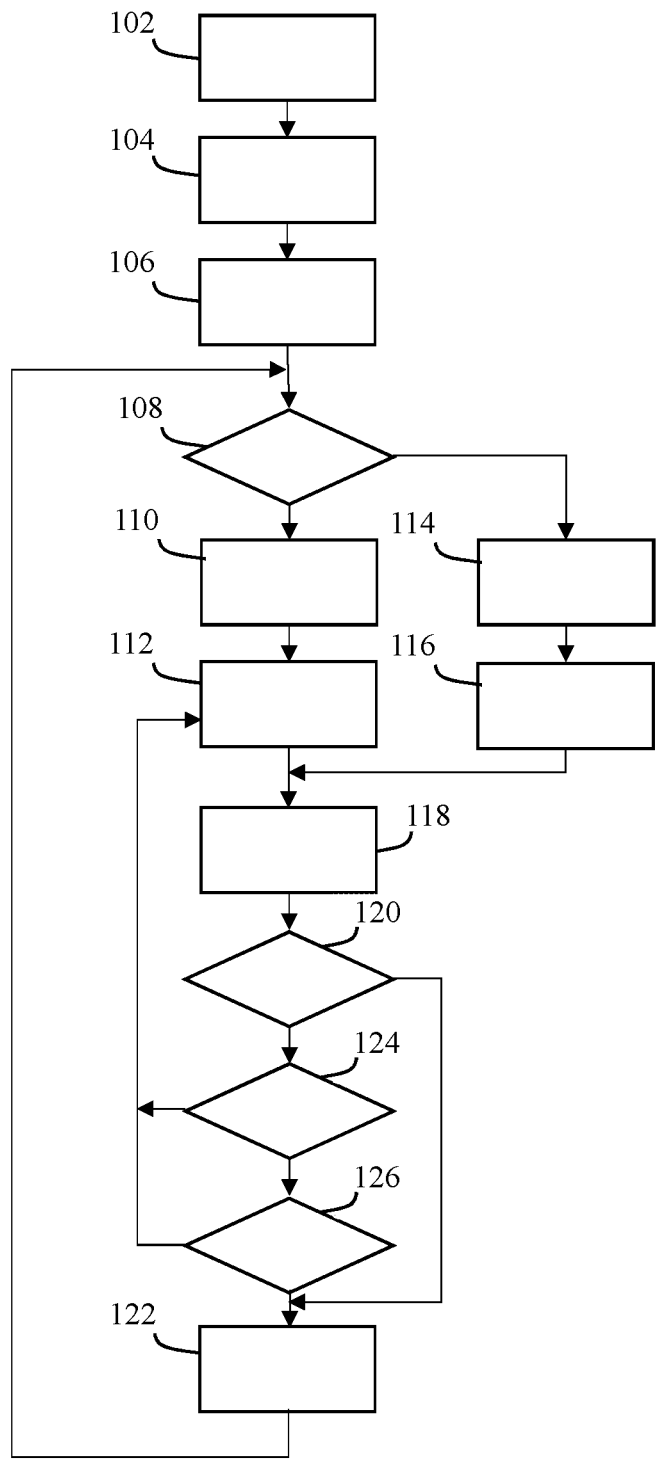
FIG. 2 is a flow chart of a method of using the adaptive fault diagnostic system of FIG. 1 for motor vehicles.

Referring now to FIG. 2, there is illustrated a flow chart for an adaptive method 100 of using the diagnostic system of FIG. 1 to learn new failure modes and failure patterns for motor vehicles 14a, 14b, 14c, 14d and communicating the associated diagnostic decisions to the repair technicians. At step 102, the method begins with the step of the diagnostic tool 12a, 12b, 12c, 12d collecting the unlabeled data for an associated vehicle 14a, 14b, 14c, 14d. Continuing with the previous example, this step may be accomplished by plugging the diagnostic tool 12a, 12b, 12c, 12d into the OBD port for the OBD system of the vehicle. It is contemplated that the unlabeled data for the new failure mode can be collected by wireless transmission from the diagnostic tool or other suitable methods.

At step 104, the unlabeled data is transmitted from the diagnostic tool 12a, 12b, 12c, 12d to a central computer 20.

At step 106, the labeled training data associated with the previously identified failure modes is provided to or by the central computer 20. In one example, the labeled training data may be transmitted from the database 18 to the central computer 20. In another example, a diagnostic machine learning model can be trained to render a diagnostic decision.

At step 108, the central computer 20 executes a novelty detection technique to determine whether the unlabeled data is novelty data associated with one or more new failure modes or normal data associated with one or more of the previously identified failure modes or known health conditions. If the central computer 20 predicts a failure mode or health condition with high confidence, the central computer 20 determines that the unlabeled data is normal data and the method proceeds to step 110. If the central computer 20 predicts the failure mode or health condition with low confidence, the central computer determines that the unlabeled data is novelty data, and the method proceeds to step 114. In this example, the central computer 20 uses a Random Forest classifier, a k-Nearest Neighbor classifier, and a Support Vector Machine classifier in a probabilistic setting to determine whether the unlabeled data is novelty data or normal data. However, other suitable classifiers can be used to detect novelty data.

More specifically, the central computer 20 executes the novelty detection technique to determine whether the unlabeled data is novelty data associated with a new failure mode or normal data corresponding with one of the previously identified failure modes or known health conditions. The central computer 20 compares the unlabeled data to the initial diagnostic model and the labeled training data to determine that the unlabeled data corresponds with normal data that is associated with one of the previously identified failure modes or known health conditions.

At step 110, the central computer 20 transmits a diagnostic decision corresponding with the associated previously identified failure mode or known health condition to the repair technician.

At step 112, the repair technician confirms that the diagnostic decision is correct by inputting a confirmation of the diagnostic decision. In this example, the diagnostic tool 12a, 12b, 12c, 12d may have an interface with a display requesting that the technician operate the interface to confirm diagnostic decision and associated failure mode. However, it is contemplated that the technician may operate any suitable interface to confirm the diagnostic decision.

At step 114, the central computer 20 selects the informative samples from the novelty data. The central computer 20 selects the informative samples by executing an uncertainty selection algorithm, a diversity selection algorithm, and a representative selection algorithm. However, it is contemplated that the central computer can select the informative samples by executing any suitable algorithm.

At step 116, the system initiates an iterative learning technique to incorporate the new failure mode, the new fault pattern, or the new health condition in the diagnostic method. In this example, the repair technician 16a, 16b, 16c, 16d labels the sample by inputting a label for the associated informative sample. In this example, the diagnostic tool 12a, 12b, 12c, 12d has an interface including a keyboard, a touchscreen, a microphone cooperating with voice recognition software, or other input devices, or any combination thereof. The interface operated by the technician 16a, 16b, 16c, 16d to input new data on the vehicle, including the new failure mode, the new fault pattern, the new health condition, or any combination thereof.

At step 118, the central computer 20 propagates the labels to the associated novelty data to provide labeled novelty data. Continuing with the previous example, the central computer 20 propagates the label by executing a plurality of semi-supervised learning techniques using Gaussian Random Fields, Local and Global consistency, and adsorption. The central computer 20 propagates the label to the unlabeled data, which was associated with but not duplicative of the informative samples, by using at least one of a k-Nearest Neighborhood graph, an ε-Neighborhood graph, and a b-matching graph.

At step 120, the central computer determines whether a number of the newly labeled samples is greater than a quantity threshold. If the number of the newly labeled samples is greater than a quantity threshold, the method proceeds to step 122. If the number of the newly labeled samples is less than a quantity threshold, the method proceeds to step 124.

At step 122, the central computer 20 updates the initial diagnostics model or the labeled training data to include the labeled novelty data.

At step 124, the central computer 20 determines whether a new failure mode, new fault pattern, or new health condition has been inputted by the repair technician that is different from the previously identified failure modes, fault patterns, or known health conditions. If the new failure mode, fault pattern, or new health condition has been inputted by the technician, the method proceeds to step 122. If the new failure mode, fault pattern, or new health condition has not been inputted by the technician, the method proceeds to step 126.

At step 126, the central computer 20 determines whether a duration of time from a most recent update of the labeled training data is longer than a time threshold. If the controller determines that the duration of time is longer than the threshold, the method proceeds to step 122. If the controller determines that the duration of time is less than the threshold, the method returns to step 112.

Because the central computer 20 can monitor a feet of vehicles, the central computer 20 is capable of learning a failure mode from one vehicle and efficiently diagnosing and predicting failures in other related vehicles in the fleet.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An adaptive A method of using a diagnostic system for motor vehicles, the method comprising:
    collecting, using a diagnostic tool, a plurality of unlabeled data associated with a motor vehicle;
    transmitting the unlabeled data from the diagnostic tool to a central computer;
    providing an initial diagnostic model and a plurality of labeled training data associated with a plurality of previously identified failure modes and known health conditions to the central computer;
    executing, using the central computer, a novelty detection technique to determine whether the unlabeled data is one of novelty data or normal data;
    executing, using the central computer, an uncertainty selection algorithm, a diversity selection algorithm, and a representative selection algorithm to select an informative sample from the novelty data;
    inputting a label, by a repair technician, for the informative sample;
    propagating, using the central computer, the label from the informative sample to the associated novelty data to provide labeled novelty data; and
    updating, using the central computer, the initial diagnostic model and the labeled training data to include the labeled novelty data.

2. The method of claim 1 further comprising the central computer identifying at least one new failure pattern associated with the unlabeled data, where the at least one new failure pattern is different from a previously identified failure pattern associated with the labeled training data.

3. The method of claim 1 further comprising the central computer identifying at least one new failure mode or at least one new health condition associated with the unlabeled data, where the at least one new failure mode is different from the previously identified failure modes, and where the at least one new health condition is different from the known health conditions.

4. The method of claim 1 further comprising the central computer using a Random Forest classifier, a k-Nearest Neighbor classifier, and a Support Vector Machine classifier in a probabilistic setting to determine whether the unlabeled data is novelty data or normal data.

5. The method of claim 4 wherein the central computer determines that the unlabeled data is novelty data in response to the central computer predicting the failure mode or a health condition with low confidence, and the central computer determines that the unlabeled data is normal data in response to the central computer predicting the failure mode or a health condition with high confidence.

6. The method of claim 1 wherein the central computer propagates the label to the unlabeled data by using at least one of a k-Nearest Neighborhood graph, an ε-Neighborhood graph, and a b-matching graph.

7. The method of claim 1 wherein the central computer propagates the label by executing a plurality of semi-supervised learning techniques using Gaussian Random Fields, Local and Global consistency, and adsorption.

8. The method of claim 1 further comprising:
    identifying, using the central computer, the labeled training data and the associated previously identified failure mode that correspond with the unlabeled data; and
    transmitting a diagnostic decision corresponding with the associated previously identified failure mode to the repair technician.

9. The method of claim 8 further comprising the repair technician inputting a confirmation of the diagnostic decision.

10. A method of using a diagnostic system to learn a new failure mode and a failure pattern for a motor vehicle and communicating an associated diagnostic decision to a repair technician, the method comprising:
    collecting, using a diagnostic tool, a plurality of unlabeled data for an associated vehicle;
    transmitting the unlabeled data from the diagnostic tool to a central computer;
    providing an initial diagnostic model and a plurality of labeled training data associated with a plurality of previously identified failure modes and known health conditions to the central computer;
    executing, using the central computer, a novelty detection technique to determine whether the unlabeled data is one of novelty data or normal data;
    executing, using the central computer, an uncertainty selection algorithm, a diversity selection algorithm, and a representative selection algorithm to select a plurality of informative samples from the novelty data;
    inputting a label, by the repair technician, for the associated informative sample;
    propagating, using the central computer, the labels to the associated novelty data to provide labeled novelty data; and
    updating, using the central computer, the labeled training data and the initial diagnostic model to include the labeled novelty data, in response to the central computer determining at least one of:
        a number of the newly labeled samples is greater than a quantity threshold;
        a new failure mode has been inputted by the repair technician that is different from the previously identified failure modes;
        a new health condition has been inputted by the repair technician that is different from the known health conditions; and
        a duration of time from a most recent update of the labeled training data is longer than a time threshold.

11. The method of claim 10 further comprising:
identifying, using the central computer, the labeled training data and the associated previously identified failure mode that correspond with the unlabeled data; and
transmitting a diagnostic decision corresponding with the associated previously identified failure mode to the repair technician.

12. The method of claim 11 further comprising the repair technician inputting a confirmation of the diagnostic decision.

13. The method of claim 11 further comprising the central computer using a Random Forest classifier, a k-Nearest Neighbor classifier, and a Support Vector Machine classifier in a probabilistic setting to determine whether the unlabeled data is novelty data or normal data.

14. The method of claim 13 wherein the central computer determines that the unlabeled data is novelty data in response to the central computer predicting the failure mode or a health condition with low confidence, and the central computer determines that the unlabeled data is normal data in response to the central computer predicting the failure mode or a health condition with high confidence.

15. The method of claim 10 further comprising the central computer identifying at least one new failure pattern associated with the unlabeled data, where the at least one new failure pattern is different from a previously identified failure pattern that is associated with the labeled training data.

16. The method of claim 10 further comprising the central computer identifying at least one new failure mode associated with the unlabeled data, where the at least one new failure mode is different from the previously identified failure mode associated with the labeled training data.

17. The method of claim 10 wherein the central computer propagates the label to the unlabeled data by using at least one of a k-Nearest Neighborhood graph, an ε-Neighborhood graph, and a b-matching graph.

18. The method of claim 10 wherein the central computer propagates the label by executing a plurality of semi-supervised learning techniques using Gaussian Random Fields, Local and Global consistency, and adsorption.

19. A system for learning a vehicle failure mode for a motor vehicle and communicating a diagnostic decision to a repair technician, the system comprising:
a diagnostic tool configured to collect a plurality of unlabeled data from a vehicle;
a database for storing an initial diagnostic model and a plurality of labeled training data;
a central computer communicating with the diagnostic tool to receive the unlabeled data and the database to receive initial diagnostic model and the labeled training data;
wherein the central computer is configured to:
execute a novelty detection technique to determine whether the unlabeled data is one of novelty data or normal data;
execute an uncertainty selection algorithm, a diversity selection algorithm, and a representative selection algorithm to select a plurality of informative samples from the novelty data;
receive a label, inputted by the repair technician, for the associated informative sample;
propagate the labels to the associated novelty data to provide labeled novelty data; and
update the initial diagnostic model and the labeled training data stored in the database to include the labeled novelty data.

20. The system of claim 19 wherein the central computer is configured to update the labeled training data, in response to the central computer determining at least one of:
a number of the newly labeled samples is greater than a quantity threshold;
a new failure mode has been inputted by the repair technician and is different from the previously identified failure modes; and
a duration of time from a most recent update of the labeled training data is longer than a time threshold.

* * * * *